W. S. STOCKTON.
MILK CAN.
APPLICATION FILED JULY 9, 1920.

1,409,610.                                   Patented Mar. 14, 1922.

William S. Stockton, Inventor

UNITED STATES PATENT OFFICE.

WILLIAM S. STOCKTON, OF ROANOKE, VIRGINIA.

MILK CAN.

1,409,610.  Specification of Letters Patent.  Patented Mar. 14, 1922.

Application filed July 9, 1920. Serial No. 394,951.

*To all whom it may concern:*

Be it known that I, WILLIAM SAMUEL STOCKTON, a citizen of the United States of America, residing at Roanoke, in the county of Roanoke and State of Virginia, have invented new and useful Improvements in Milk Cans, of which the following is a specification.

The object of the invention is to provide a milk can particularly of the portable type adapted for use either in the shipment or distribution or dispensing of milk and having means in connection therewith whereby a preserving temperature of the contents of the can may be maintained to guard against the souring or deterioration of the product, while in transit, and with this object in view, the invention consists in a construction and combination of parts, of which a preferred embodiment is shown in the accompanying drawing, wherein:—

Figure 1:
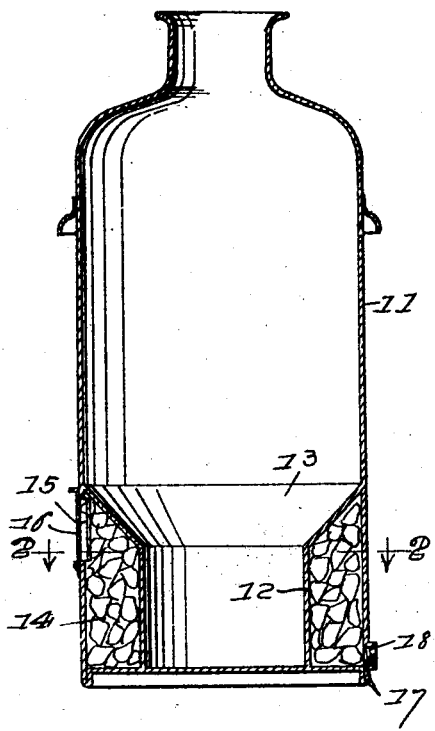
Figure 1, is a sectional view of a can embodying the invention, the same being of a form particularly adapted for the shipment of milk.

The can in general form and dimensions may be varied to suit the special purpose for which it is designed and as indicated may follow the general outlines of the cans now ordinarily employed in transferring milk by express or by vehicle from the dairy or farm, to the dealer or retailer, and enclosed within and formed as a part of the same, near its bottom, and preferably as illustrated, within the contour or outline of the can proper, is an annular chamber 10 separated from the interior of the can proper as shown at 11 by a partition 12 of which the upper portion is of funnel shape as indicated at 13 to the end that the interior cleansing of the can or that portion of the same which is designed for the reception of the milk or like liquid product, may be accomplished with the same facility as with the ordinary cans now in common use. The annular compartment which is disposed in surrounding relation with the lower portion of the main body of the can, is designed for the reception of ice as indicated at 14 or any equivalent refrigerating material, or in fact any desired tempering agent and is accessible through a charging opening 15 fitted with a movable door or closure 16 through which the tempering agent may be introduced. Also an outlet or drain opening 17 located near the bottom of the annular chamber and formed in the exterior wall of the vessel may be fitted with a screw cap 18 or the equivalent thereof to facilitate the removal of water incident to the melting of ice when the latter is used as the refrigerating element.

Figure 3:
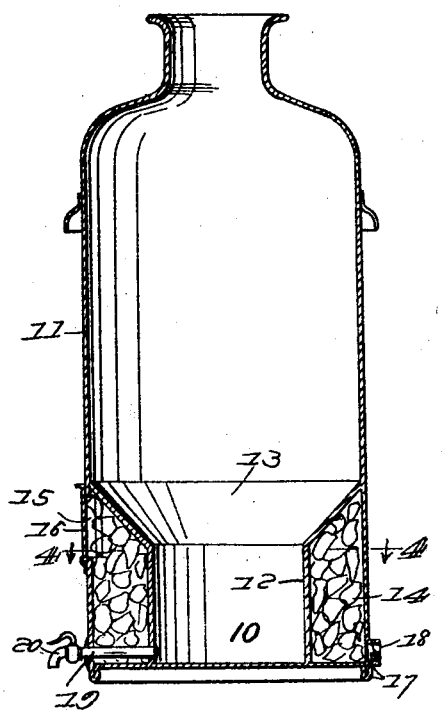
Figure 3, is a sectional view of the can equipped especially for use in the distribution or dispensing of milk.
Figure 2:
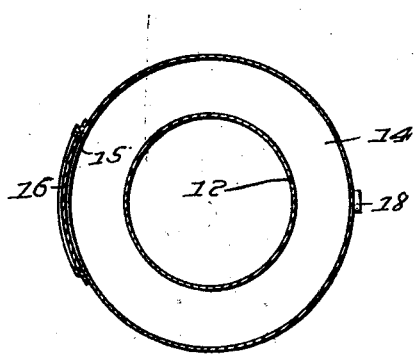
Figure 2, is a cross sectional view of the same on the plane indicated by the line 2—2 of Figure 1.
Figure 4:
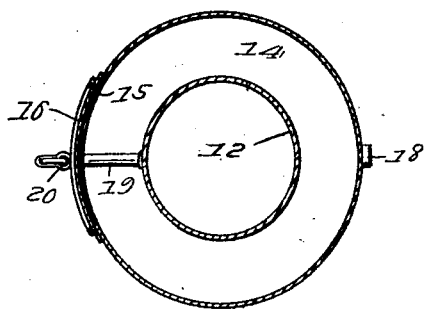
Figure 4, is a cross sectional view of the same on the plane indicated by the line 4—4 of Figure 3.

When the can is designed for use by the retailer or by an agent in the delivery of milk at retail or in small quantities from the wagon, it may in addition to the features above described be provided with a delivery outlet 19 fitted with a valve or faucet 20 located near the bottom of the can and in communication with the interior of the main compartment thereof as indicated in Figure 3.

It will be obvious that an arrangement such as described will insure the maintenance of the contents of the can for an indefinite length of time, at a temperature which will not only prevent souring in warm weather during the transportation of the milk from the point of production to the point of delivery, but which will serve to counter-act the effect of the agitation to which the contents of the receptacles of this kind are subjected, particularly when transferred by wagon or a like vehicle over country roads, and if the milk is to be distributed or dispensed from the receptacle, the refrigerating chamber may be re-charged from time to time to maintain the contents at a uniform temperature.

The invention having been described, what is claimed as new and useful is:—

A milk can provided adjacent its bottom and extending for a portion of its height with an annular partition spaced from the exterior wall of the can and defining an annular chamber for the reception of a tempering agent, the upper portion of the partition being funnel shaped and terminally connected with the wall of the can, a movable closure controlling a charging opening providing access to the annular chamber from the exterior of the can, and a valved dispensing outlet arranged in communication with the interior of the can at the bottom and extending through said chamber.

In testimony whereof he affixes his signature.

WILLIAM S. STOCKTON.